No. 889,716. PATENTED JUNE 2, 1908.
D. E. PRESTON.
CLEANING MACHINE.
APPLICATION FILED APR. 16, 1906.
3 SHEETS—SHEET 3.
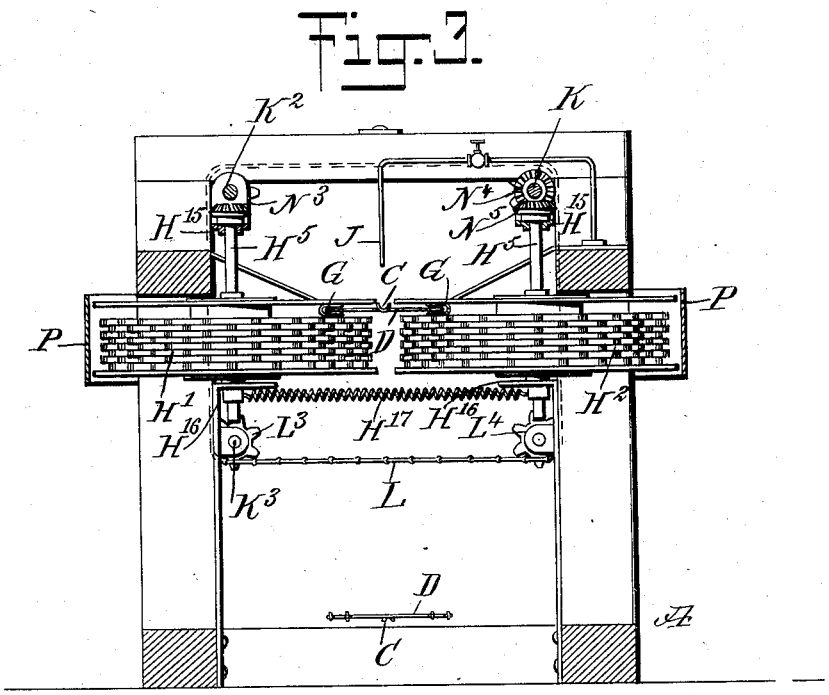
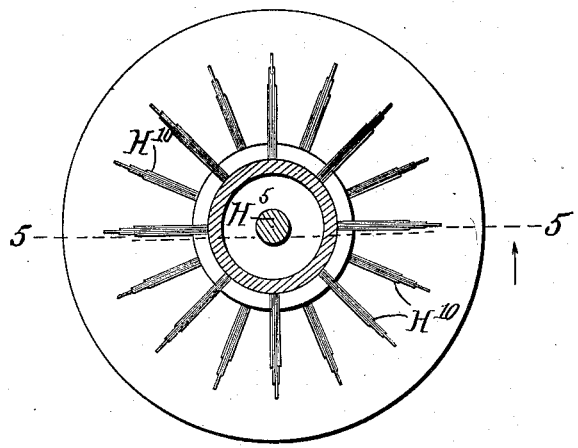
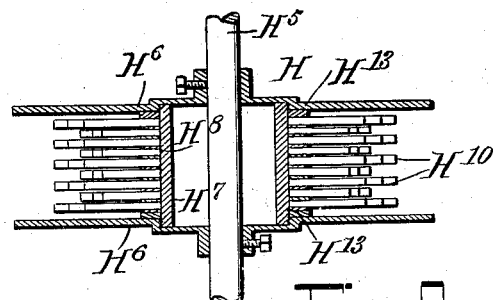
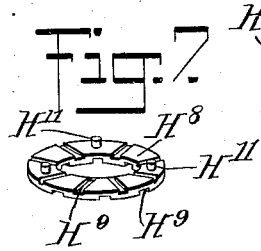
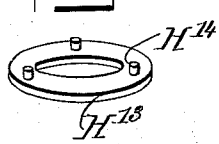
WITNESSES
INVENTOR
Delmer E. Preston
BY
ATTORNEYS

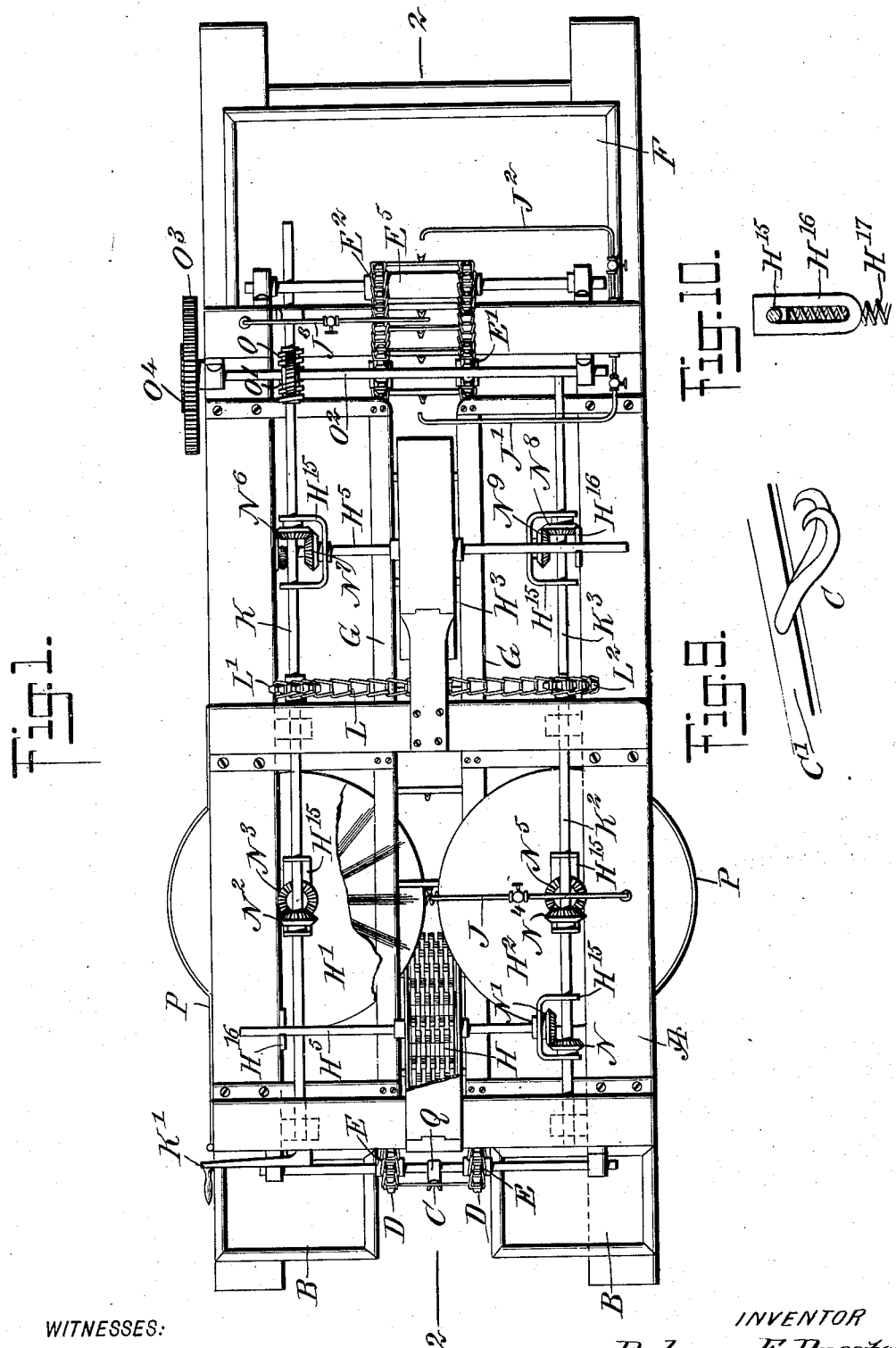

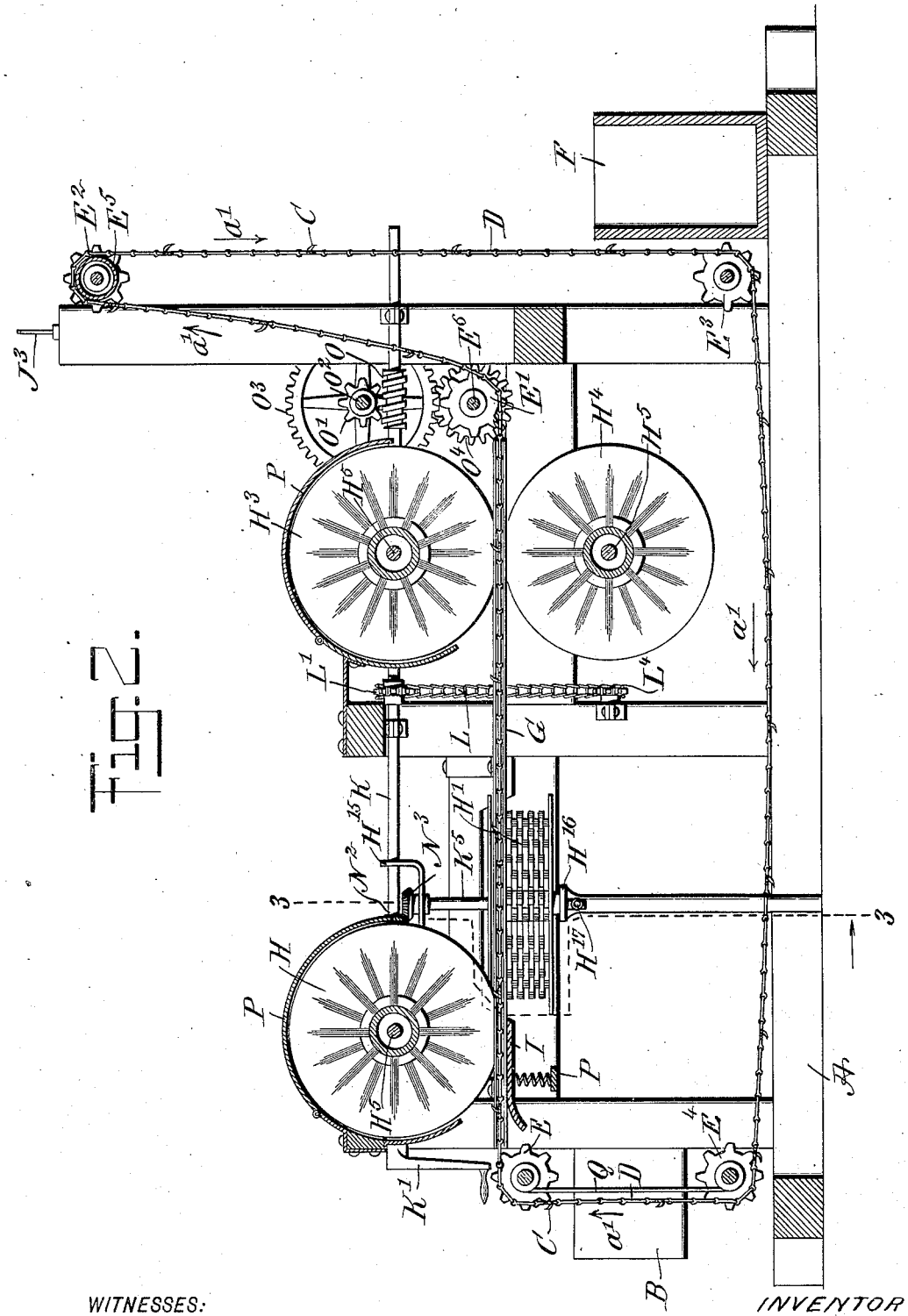

UNITED STATES PATENT OFFICE.

DELMER ELBA PRESTON, OF CHICAGO, ILLINOIS, ASSIGNOR TO WOLF, SAYER & HELLER, INC., OF CHICAGO, ILLINOIS, A CORPORATION OF DELAWARE.

CLEANING-MACHINE.

No. 889,716.  Specification of Letters Patent.  Patented June 2, 1908.

Application filed April 16, 1906. Serial No. 311,895.

*To all whom it may concern:*

Be it known that I, DELMER ELBA PRESTON, a citizen of the United States, and a resident of Chicago, in the county of Cook and State of Illinois, have invented a new and Improved Cleaning-Machine, of which the following is a full, clear, and exact description.

The invention relates to machinery used in packing or slaughter houses for cleaning and scraping hogs and other animals and parts thereof, such as pigs' feet, snouts, heads and the like.

The object of the invention is to provide a new and improved cleaning machine, arranged to readily remove dirt, hairs and other undesirable parts or extraneous matter from the article under treatment, and without the use of knives or similar cutting devices and without danger of injuring the article by tearing or cutting the same, and also without requiring the employment of skilled labor.

The invention consists of novel features and parts and combinations of the same which will be more fully described hereinafter and then pointed out in the claims.

A practical embodiment of the invention is represented in the accompanying drawings forming a part of this specification, in which similar characters of reference indicate corresponding parts in all the views.

Figure 1 is a plan view of the improvement; Fig. 2 is a longitudinal sectional elevation of the same on the line 2—2 of Fig. 1; Fig. 3 is a transverse section of the same on the line 3—3 of Fig. 2; Fig. 4 is an enlarged sectional side elevation of one of the rotary brushes; Fig. 5 is a sectional plan view of the same on the line 5—5 of Fig. 4; Figs. 6 and 7 are perspective views of the brush disks for holding the bristles; Fig. 8 is a perspective view of one of the end disks of a rotary brush; Fig. 9 is a perspective view of one of the holders for supporting the articles to be cleaned; and Fig. 10 is a sectional plan view of one of the brush shafts and its bearing.

On the front end of a suitably constructed frame A are arranged boxes B for containing the articles to be cleaned by the machine, the articles being successively removed from the boxes B by an operator and hung on to holders C, held on an endless carrier D, preferably in the form of two sprocket chains placed a suitable distance apart and connected with each other by the cross-arms C' of the holders C each of which is preferably in the form of a double hook, as plainly shown in Fig. 9. By the arrangement described the articles are freely hung on the holders between the chains so that the articles can be readily engaged by brushes and other devices as hereinafter more fully described.

The endless carrier D passes over sprocket wheels E, E', $E^2$, $E^3$ and $E^4$ journaled on the main frame A and on the shaft of the sprocket wheels $E^2$ and between the latter is arranged a drum $E^5$, so that the articles in passing over the drum $E^5$ drop off the holders C and down into a box F held on the frame A. The upper run of the endless carrier D while passing from the sprocket wheel E to the sprocket wheel E', travels at its side edges in longitudinal side guideways G attached to the main frame A, so that the upper run of the endless carrier D is held in horizontal position, and the articles while carried forward by this upper run are subjected to the cleaning action of revoluble yieldingly mounted brushes H, H', $H^2$, $H^3$ and $H^4$, of which the brush H is arranged above the upper run of the endless carrier D and operates in conjunction with a cushion or a spring resistance plate spring I, supported from one of the guideways G. As shown in the drawings, the brush H revolves directly above the upper run of the endless carrier D, while the resistance plate I is located immediately below the said upper run of the endless carrier D. Thus as the article is carried along it passes between the resistance plate I and the brush H, and is then acted on by the bristles of the brush to remove extraneous matter from the article. The rotary brushes H', $H^2$ form a pair of horizontally disposed brushes, and are located on opposite sides of the upper run of the endless carrier D, so that all sides of the article are acted on by the bristles of the said brushes while passed between the same. The brushes $H^3$ and $H^4$ are likewise arranged as a pair, respectively located above and below the upper run of the endless carrier D, so that the article is carried between the said pair of brushes to be acted on by the bristles thereof at the top and bottom. Each of the rotary brushes H', $H^2$, $H^3$ and $H^4$ is of the same construction, that is, provided with a shaft $H^5$ (see Figs. 4 and 5) on which are secured flanges $H^6$, screwing on the ends of a tubular hub $H^7$, on which are held disks $H^8$ having radial grooves $H^9$ disposed alternately on opposite faces of the disk, and into each radial groove $H^9$ fits a bunch of bristles $H^{10}$ in the form of a steel leaf spring, having its leaves of different length, the longest one being arranged in the middle of the bunch and engaged at opposite sides by shorter leaves, which in turn are engaged on their outer faces by still shorter leaves, as will be readily understood by reference to Fig. 4. By the arrangement described, exceedingly strong, durable and readily yielding bristles are provided, adapted to thoroughly remove extraneous matter from the articles under treatment. The said disks $H^8$ are provided with pins $H^{11}$, engaging apertures $H^{12}$ in the adjacent disks $H^8$, and the end disks $H^{13}$ located adjacent to the inner faces of the flanges $H^6$, are without radial grooves, but are provided with pins $H^{14}$ for engaging the corresponding apertures $H^{12}$ in the next following disk $H^8$. After the disks and their bunches of bristles are assembled on the hub $H^7$, the flanges $H^6$ are screwed on to the ends of the tubular hub $H^7$ and press against the outermost disks $H^{13}$ so as to securely clamp the several disks in position between the flanges $H^6$, and then the flanges are fastened in place on the shaft $H^5$ by set screws. By having the flanges $H^6$, the articles are readily passed between the flanges so as to be engaged by the free ends of the bristles, to allow the latter to effectively act on the articles with a view to properly clean the same. By having the grooves $H^9$ arranged in the manner described, it is evident that a large number of bunches of bristles $H^{10}$ may be used to insure thorough cleaning of each part of the surface of the article under treatment.

In order to singe hairs or the like, suitable burners or singers $J$, $J'$, $J^2$ and $J^3$ are provided, extending close to the path of the article carried along by the endless carrier $D$, one of the burners $J$ being preferably located in the rear of the brush $H$ above the brushes $H'$ and $H^2$, the burners $J'$ and $J^2$ being located at a point between the sprocket wheels $E'$, $E^2$, and the burner $J^3$ being preferably located adjacent to the sprocket wheel $E^2$. Water supply pipes are arranged over the path of the article, to readily wash off loosened matter.

In order to impart the necessary rotary motion to the brushes $H$, $H'$, $H^2$, $H^3$ and $H^4$ as well as to the endless carrier $D$, the following arrangement is made. On the main frame $A$ is journaled a longitudinally extending shaft $K$, provided at one end with a crank arm $K'$ adapted to be turned by the operator, or the said shaft is provided with suitable pulleys connected with other machinery for imparting a rotary motion to the shaft $K$ by power. The shaft $K$ drives two additional longitudinal shafts $K^2$, $K^3$, likewise journaled in bearings on the main frame $A$, and for this purpose a sprocket chain $L$ is employed, passing over sprocket wheels $L'$, $L^2$, $L^3$ and $L^4$, of which the sprocket wheel $L'$ is secured on the shaft $K$, the sprocket wheel $L^2$ is attached to the shaft $K^2$, the sprocket wheel $L^3$ is secured to the shaft $K^3$ and the sprocket wheel $L^4$ is an idler. Now, when the shaft $K$ is rotated a simultaneous rotary motion is given to the shafts $K^2$ and $K^3$. On the shaft $K^2$ is secured a bevel gear wheel $N$ (see Fig. 1) in mesh with bevel gear wheel $N'$ fastened to the shaft $H^5$ of the rotary brush $H$, so that when the machine is in operation the rotary brush $H$ is rotated from the shaft $K^2$ by the bevel gear wheels $N$ and $N'$. On the shaft $K$ is secured a bevel gear wheel $N^2$ in mesh with a bevel gear wheel $N^3$ secured on the upper end of the shaft $H^5$ for the rotary brush $H'$, and a bevel gear wheel $N^4$, secured on the shaft $K^2$, is in mesh with a bevel gear wheel $N^5$ attached to the upper end of the shaft $H^5$ for the rotary brush $H^2$, so that both brushes $H'$ and $H^2$ are rotated in unison. A bevel gear wheel $N^6$ is secured to the shaft $K$ and is in mesh with a bevel gear wheel $N^7$, secured to the transverse shaft $H^5$ of the rotary brush $H^3$, and on the shaft $K^3$ is secured a bevel gear wheel $N^8$ in mesh with a bevel gear wheel $N^9$ secured on the shaft $H^5$ of the rotary brush $H^4$; thus the brushes $H^3$ and $H^4$ are rotated in unison with each other and in unison with the other brushes $H'$ and $H^2$.

As previously stated the revoluble brushes $H$, $H'$, $H^2$, $H^3$ and $H^4$ are yieldingly mounted and for this purpose the shaft $H^5$ of each brush has its bevel gear wheel end journaled in a bearing $H^{15}$ mounted to swing on the shaft from which the brush shaft $H^5$ is driven. Thus the bearing $H^{15}$ for the shaft $H^5$ of the brush $H$ is hung on the shaft $K^2$ on which is also hung the bearing $H^{15}$ for the shaft $H^5$ of the brush $H^2$, and on the shaft $K$ are hung the bearings $H^{15}$ for shafts $H^5$ of the brushes $H'$, and $H^3$. The bearing $H^{15}$ for the shaft $H^5$ of the brush $H^4$ is hung on the shaft $K^3$. The free end of each shaft $H^5$ is mounted to turn in and to slide in a bearing $H^{16}$ (see Fig. 10) attached to the main frame $A$. The shafts $H^5$ for the brushes $H'$, $H^2$ and $H^4$ are each pressed on by a spring $H^{17}$ to swing the corresponding brush $H'$, $H^2$ and $H^4$ towards the endless carrier $D$ and the articles supported thereon by the use of the holders $C$, it being understood that the brushes $H$ and $H^3$ require no springs as these brushes, by their own weight, move downward in contact with the articles to be cleaned.

On the shaft $K$ is secured a worm $O$ (see Figs. 1 and 2) in mesh with a worm wheel $O'$ fastened on a transversely extending shaft $O^2$, journaled in suitable bearings attached to the main frame $A$. On the shaft $O^2$ is secured a gear wheel $O^3$ in mesh with a pinion $O^4$ secured to the shaft $E^6$ carrying the sprocket wheel E', so that when the shaft K is rotated a slow rotary motion is transmitted by the worm O and worm wheel O' to the shaft O², and the rotary motion of the latter is transmitted by the gear wheel O³ and the pinion O⁴ to the shaft E⁶ and the sprocket wheel E', so that the latter imparts a traveling motion to the endless carrier D in the direction of the arrows a', indicated in Fig. 2. Suitable hoods P are provided for the rotary brushes H, H', H² and H³. On the shafts for the sprocket wheels E, E⁴, is mounted a guard Q to allow the holders C to butt against, while the operator places the article onto the holders.

When the machine is in operation, the operator standing at the front end of the machine takes a pig's foot or other article at a time from one of the boxes B and places it upon the holder C which travels upward over the sprocket wheel E, and this holder slowly carries the pig's foot, first, between the brush H and the resistance plate I, then between the pairs of brushes H' and H², H³ and H⁴, so that the brushes brush the top, bottom and sides as well as the ends, and the article is also subjected during its forward travel to a singeing process by the flames of the burners J, J', J² and J³. When the cleaned article is carried by the endless carrier D over the sprocket wheels E², then the articles drop off the holder C and fall down into the box F from which the cleaned articles can be removed.

Although I have shown and described a number of brushes sufficient for properly cleaning pigs' feet and the like, the number of brushes may be increased if found necessary.

Having thus described my invention, I claim as new and desire to secure by Letters Patent:

1. In a cleaning machine, an endless traveling carrier, holders on the said carrier, a revoluble brush above the carrier for engaging the articles held on the said holders, a cushioned resistance plate below the carrier opposite the said brush, the holders and their articles passing between the brush and the resistance plate, and pairs of revoluble brushes in the rear of the said single brush and its resistance plate, one pair of brushes being mounted on vertical pivots and the other pair on horizontal pivots the said carrier and its holders passing between the brushes of each pair.

2. In a cleaning machine, an endless traveling carrier, holders on the said carrier, a yieldingly mounted and revoluble brush for engaging the articles held on the said holders, a cushioned resistance plate opposite the said brush, the holders and their articles passing between the brush and the resistance plate, pairs of yieldingly mounted and revoluble brushes in the rear of the said single brush and its resistance plate, the said carrier and its holders passing between the brushes of each pair, one pair of brushes engaging the top and bottom of the carrier and the other pair of brushes engaging the sides thereof, a drive shaft, and means for operating the carrier and brushes from said shaft.

3. In a cleaning machine, an endless traveling carrier, holders on the said carrier, a revoluble brush for engaging the articles held on the said holders, a cushioned resistance plate opposite the said brush, the holders and their articles passing between the brush and the resistance plate, pairs of revoluble brushes in the rear of the said single brush and its resistance plate, the said carrier and its holders passing between the brushes of each pair, one pair of brushes engaging the top and bottom of the carrier and the other pair of brushes engaging the sides thereof, and a plurality of singeing burners adjacent to the path of travel of the said endless carrier at different points in the path of said carrier.

4. In a cleaning machine, a carrier, and pairs of revoluble brushes, one pair being mounted on vertical pivots at opposite sides of the carrier and the other pair on horizontal pivots, one below and the other above the carrier, each brush being provided with side flanges projecting beyond the brush material thereof.

5. In a cleaning machine, an endless carrier formed of chains connected by bars, holders for the articles on the bars of the carrier, a yieldingly mounted plate below the carrier pairs of revoluble brushes, one pair being mounted on vertical axes and the other pair on horizontal axes, and a brush in front of the pairs of brushes on vertical axes and above the endless carrier opposite the yielding plate, each brush having radially projecting bunches of brush material and side flanges projecting beyond the brush material thereof.

6. In a cleaning machine, a supporting frame, two horizontal parallel shafts mounted in the upper part of the frame, one being longer than the other, a third horizontal shaft parallel with the shorter of the first mentioned shaft, mounted in the lower part of the frame, means for operating the shafts in unison, vertical brush shafts driven from the first named horizontal shafts, brushes on the shafts, horizontal brush shafts, one driven from the longer of the first named horizontal shafts and the other from the horizontal shaft mounted in the lower part of the frame, brushes on the said shafts, and an endless carrier traveling between the said brushes.

In testimony whereof I have signed my name to this specification in the presence of two subscribing witnesses.

DELMER ELBA PRESTON.

Witnesses:
   RICHARD A. TRIS,
   EDW. MUNCH.